No. 869,820. PATENTED OCT. 29, 1907.
E. WINANS.
POWER TRANSMITTING DEVICE.
APPLICATION FILED MAR. 18, 1907.

WITNESSES:
J. H. Curtiss.
Chas. F. Fogg.

INVENTOR
Edwin Winans,
BY
A. M. Pierce,
ATTORNEY.

UNITED STATES PATENT OFFICE.

EDWIN WINANS, OF NEW YORK, N. Y., ASSIGNOR TO Y-NAN-S TREADLE CO., OF NEW YORK, N. Y.

POWER-TRANSMITTING DEVICE.

No. 869,820.     Specification of Letters Patent.     Patented Oct. 29, 1907.

Application filed March 18, 1907. Serial No. 362,919.

*To all whom it may concern:*

Be it known that I, EDWIN WINANS, a citizen of the United States, residing at New York, in the county of New York and State of New York, have invented certain new and useful Improvements in Power-Transmitting Devices, of which the following is a specification, reference being had therein to the accompanying drawing.

My invention relates especially to means and mechanism for applying continuous rotary motion to a shaft to be driven, by means of an intermittently operated clutch, and has for its object the provision of a simple, cheap and effective clutch of this character, wherein the use of springs is entirely dispensed with, and slipping of the parts is obviated.

To attain the desired end, my invention consists essentially in a power-transmitting device in which is comprised a shaft to be driven; a hub fixed to said shaft and having an annular projection at the side thereof; a plurality of leaves loosely held within the annular projection at an angle to the shaft to be driven; a power-applying device loosely mounted on said shaft, and means, controlled by the power-applying device, for applying pressure to the inner edges of the leaves, whereby all the parts are locked together and caused to turn in unison; all of which will be hereinafter first fully described, and then pointed out in the claims.

Figure 1:
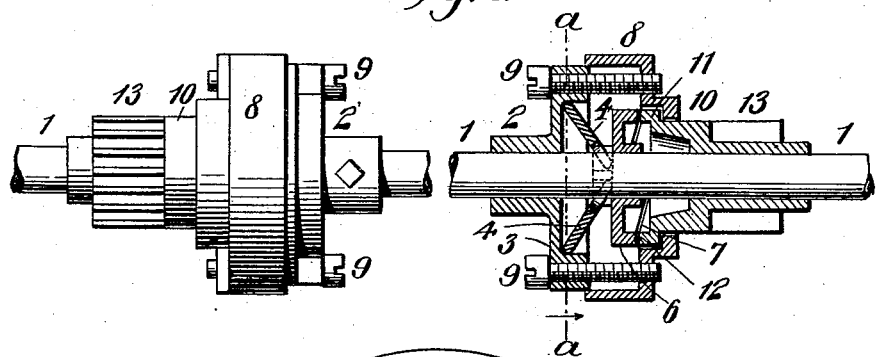
Figure 2:
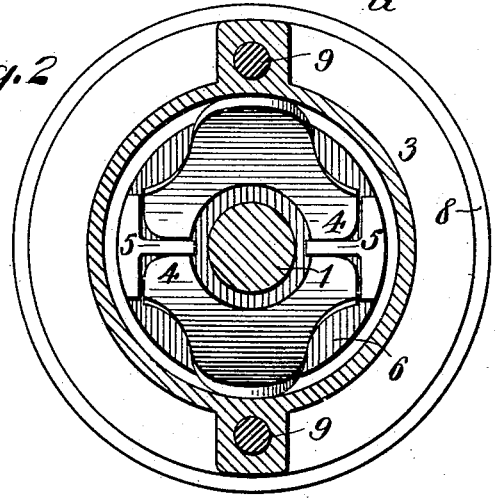
Figure 3:
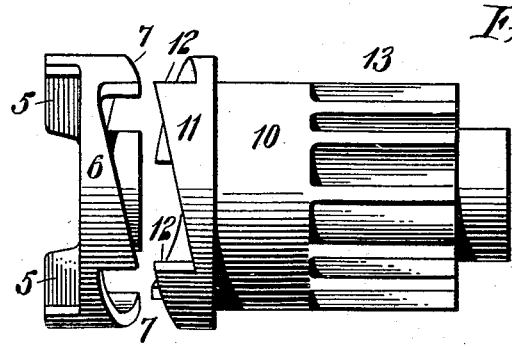

In the drawing, Figure 1 is a side elevation of a device embodying my invention, showing a right- and left-hand clutch, the right-hand clutch being in vertical, axial section. Fig. 2 is an enlarged, vertical cross-sectional view at line *a—a* of Fig. 1, looking from the left. Fig. 3 is an enlarged side elevation of the power-applying mechanism removed from the other parts of the device.

Similar numerals of reference, wherever they occur, indicate corresponding parts in all the figures.

1 is a shaft to be driven. 2 is a hub fixed thereon and provided with an annular projection 3.

4, 4 are leaves having their outer edges resting against the annular projection 3, and their inner edges seated upon bearings 5 projecting from a flange 6 encircling the shaft 1, said flange having beveled projections 7 on its face opposite to the bearings for the leaves 4.

8 is a casing secured to the hub 2 by means of screws 9.

10 is a sleeve loosely mounted on the shaft 1 and having on its inner face an enlargement 11 within the casing 8, and beveled projections 12 oppositely disposed to the projections 7.

13 are teeth in the sleeve 10 for applying rotary motion, as by a rack.

When constructed and arranged in accordance with the foregoing description, the operation of my device is as follows: Rotation being imparted to the sleeve 10, the projections 12 on its inner face move, with the action of a screw, upon the projections 7, forcing the flange 6 inward, applying pressure to the inner edges of the leaves 4, which are disposed at an angle, as particularly shown in Fig. 1 of the drawing. The moment such pressure is applied, the outer edges of the leaves bind against the annular projection 3, locking the parts together, and causing them to revolve in unison with the shaft. When power is no longer exerted upon the sleeve 10, the pressure on the leaves 4 ceases, and the shaft, with the parts permanently connected therewith, continues to revolve, while the sleeve remains stationary, until motion is again imparted thereto by means of the teeth thereon.

Having now fully described my invention, what I claim as new therein and desire to secure by Letters Patent, is:

1. A power-transmitting device in which is comprised a shaft to be driven; a hub fixed to said shaft and having an annular projection at one side; a plurality of leaves loosely held within the annular projection at an angle to the shaft to be driven; a power-applying device loosely mounted on said shaft, and means, controlled by the power-applying device, for applying pressure to the edges of the leaves next to the shaft, whereby all the parts are locked together and caused to move in unison, substantially as shown and described.

2. In a device of the character herein specified, a shaft to be driven; a hub fixed to said shaft and having an annular projection at its side; a plurality of leaves loosely held between the annular projection and the shaft at an angle thereto; a bearing for the inner edges of the leaves, provided with beveled projections on its face opposite to the leaves, and a power-applying device loosely mounted upon the shaft and having beveled projections on its face, the whole combined and arranged to operate substantially as shown and described.

In testimony whereof I hereto affix my signature in presence of two witnesses.

EDWIN WINANS.

Witnesses:
    LOUIS F. BRAUN,
    A. M. PIERCE.